(12) United States Patent
Takemoto et al.

(10) Patent No.: US 11,614,232 B2
(45) Date of Patent: Mar. 28, 2023

(54) ATTACHMENT STRUCTURE OF GLOW PLUG WITH COMBUSTION PRESSURE SENSOR AND GLOW PLUG WITH COMBUSTION PRESSURE SENSOR

(71) Applicant: DENSO CORPORATION, Kariya (JP)

(72) Inventors: Shoichi Takemoto, Kariya (JP); Nobuyuki Abe, Kariya (JP); Kenji Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 787 days.

(21) Appl. No.: 16/418,112

(22) Filed: May 21, 2019

(65) Prior Publication Data

US 2019/0271468 A1    Sep. 5, 2019

Related U.S. Application Data

(63) Continuation of application No. PCT/JP2017/041901, filed on Nov. 21, 2017.

(30) Foreign Application Priority Data

Nov. 22, 2016   (JP) .............................. JP2016-226925

(51) Int. Cl.
  *F23Q 7/22*   (2006.01)
  *F02P 19/02*  (2006.01)
  *G01L 23/22*  (2006.01)
  *F23Q 7/00*   (2006.01)

(52) U.S. Cl.
  CPC .............. *F23Q 7/22* (2013.01); *F02P 19/028* (2013.01); *F23Q 7/00* (2013.01); *G01L 23/22* (2013.01); *F23Q 2007/005* (2013.01)

(58) Field of Classification Search
  CPC ................. F23Q 7/22; F23Q 2007/002; F23Q 2007/005; F23Q 7/001; F02P 19/028; G01L 23/20; G01L 23/22; G01L 23/222
  USPC ....................................... 123/145 A; 219/270
  See application file for complete search history.

(56) References Cited

U.S. PATENT DOCUMENTS

| | | | | |
|---|---|---|---|---|
| 5,706,847 A | * | 1/1998 | Strait | ...................... H01T 13/08 |
| | | | | 123/169 PA |
| 2001/0015402 A1 | * | 8/2001 | Murai | ...................... F23Q 7/001 |
| | | | | 248/554 |
| 2002/0130121 A1 | * | 9/2002 | Taniguchi | ............... F23Q 7/001 |
| | | | | 123/145 A |
| 2011/0192358 A1 | * | 8/2011 | Ramond | ................. G01L 23/10 |
| | | | | 73/114.18 |

FOREIGN PATENT DOCUMENTS

| | | |
|---|---|---|
| JP | 2012-177484 | 9/2012 |
| JP | 2015-152274 | 8/2015 |
| JP | 2015152274 A * | 8/2015 |

* cited by examiner

*Primary Examiner* — Logan M Kraft
*Assistant Examiner* — Joshua Campbell
(74) *Attorney, Agent, or Firm* — Nixon & Vanderhye P.C.

(57) ABSTRACT

On an inner wall surface of a plug hole, an internal thread portion and a seat portion are formed. The seat portion has a tapered seat surface. A glow plug with a combustion pressure sensor includes a housing, a glow heater, a load transfer member, and a pressure detector. The housing has an external thread and a seat facing portion. The seat facing portion has a tapered contact surface in surface contact with the tapered seat surface. A recessed portion recessed to be in non-contact with the seat portion is formed annularly about a central axis of the housing.

6 Claims, 13 Drawing Sheets

ATTACHMENT STRUCTURE OF GLOW PLUG WITH COMBUSTION PRESSURE SENSOR AND GLOW PLUG WITH COMBUSTION PRESSURE SENSOR

CROSS-REFERENCE TO RELATED APPLICATION

This application is continuation of International Application No. PCT/JP2017/041901 filed Nov. 21, 2017, which designated the U.S. and claims priority to Japanese Patent Application No. 2016-226925 filed Nov. 22, 2016, the entire contents of each of which are incorporated herein by reference.

BACKGROUND

Technical Field

The present disclosure relates to an attachment structure of a glow plug with a combustion pressure sensor and a glow plug with a combustion pressure sensor.

Background Art

A glow plug with which a combustion pressure sensor is integrated, is used by being attached to a plug hole of an internal combustion engine.

SUMMARY

In accordance with an aspect of the present disclosure, there is provided an attachment structure of a glow plug with a combustion pressure sensor. The glow plug with the combustion pressure sensor is configured to be attached to an internal combustion engine. The internal combustion engine includes a plug hole. The plug hole has an inner wall surface and the inner wall surface of the plug hole is formed with an internal thread portion and a seat portion. The glow plug with the combustion pressure sensor includes a housing that is fixable to the plug hole. The housing includes an external thread portion screwed to the internal thread portion and a seat facing portion facing the seat portion of the plug hole in an axial direction. A recessed portion is formed in a radial portion of at least one of the seat facing portion and the seat portion, and is axially recessed to be in non-contact with the seat portion or the seat facing portion, and is formed annularly about a central axis of the housing.

In accordance with another aspect of the present disclosure, there is provided a glow plug with a combustion pressure sensor. The glow plug includes a housing that is fixable to a plug hole of an internal combustion engine. An internal thread portion and a seat portion are formed in an inner wall surface of the plug hole. The seat portion has a taper seat surface. The housing includes an external thread portion screwed to the internal thread portion, and a seat facing portion facing the seat portion in an axial direction. The seat facing portion has a tapered contact surface in surface contact with the tapered seat surface, and a recessed portion axially recessed to be in non-contact with the seat portion or the seat facing portion. Each of the tapered contact surface and the recessed portion is formed annularly about a central axis of the housing.

BRIEF DESCRIPTION OF THE DRAWINGS

The above-described objects, other objects, features and advantageous effects in the present disclosure will become more apparent from the following detailed description with reference to the accompanying drawings.

In the accompanying drawings.

DETAILED DESCRIPTION OF THE PREFERRED EMBODIMENTS

Figure 1:
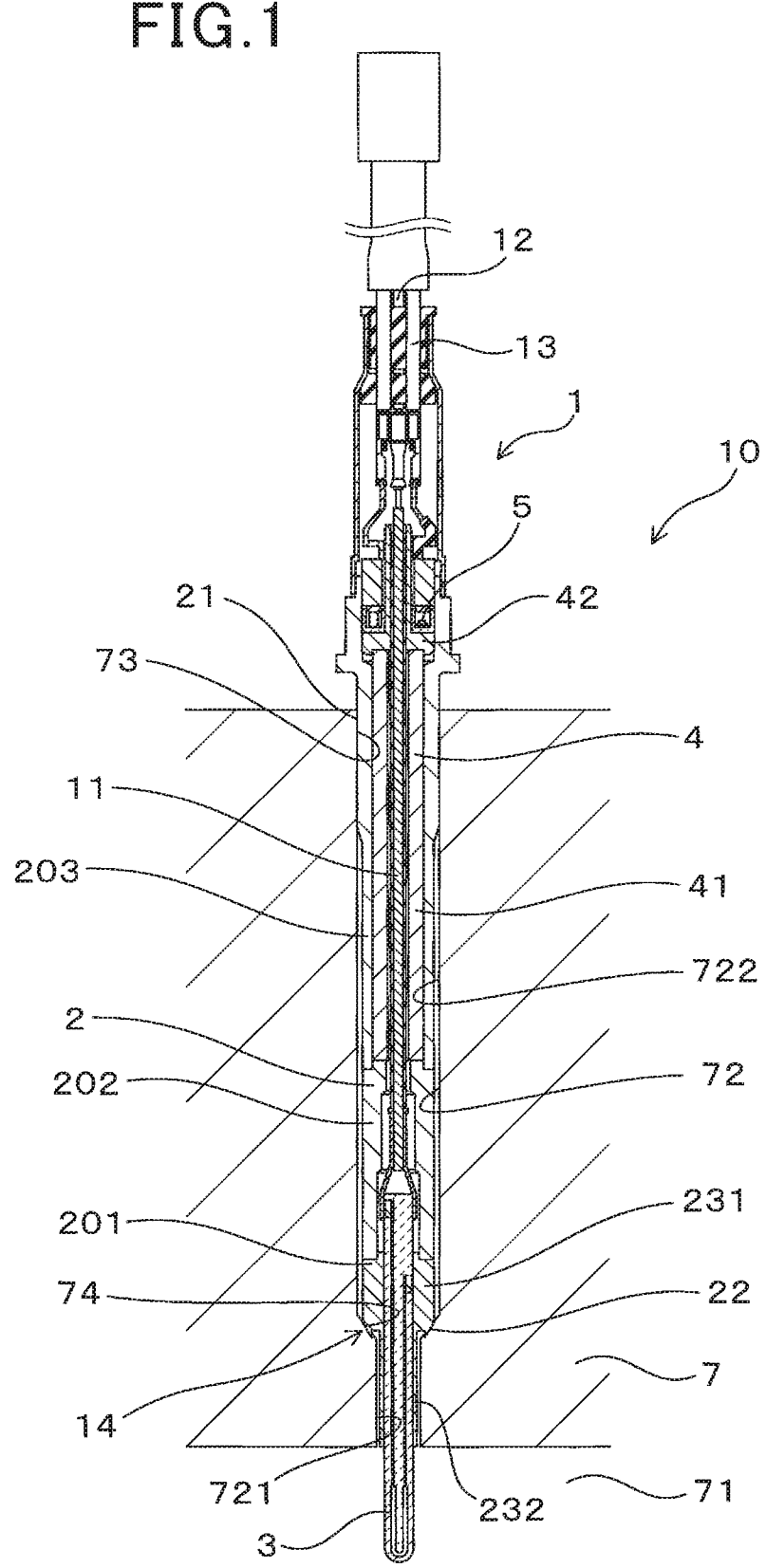
FIG. 1 is a cross-sectional view along an axial direction of an attachment structure of a glow plug with a combustion pressure sensor, in a first embodiment.

The glow plug with the combustion pressure sensor (hereinafter referred to merely as a glow plug) has a function of preheating the inside of a combustion chamber and a function of detecting a combustion pressure generated in the combustion chamber.

On the inner wall surface of the plug hole, an internal thread portion and a tapered seat surface inclined on the combustion chamber side relative to the internal thread portion are provided. The glow plug has a housing fixed to the plug hole. The housing has an external thread portion and a tapered contact surface in surface contact with the tapered seat surface of the plug hole, on the tip side relative to the external thread portion.

Accordingly, when the glow plug is attached to the plug hole, the tapered contact surface comes into surface contact with the tapered seat surface, so that a sealing property of the combustion chamber is ensured.

Such a glow plug has the following problems.

From the viewpoint of a gas sealing property in a contact portion between the tapered contact surface and the tapered seat surface (hereinafter referred to merely as a contact portion), the tapered contact surface and the tapered seat surface are required to be brought in secure contact with each other along the entire circumference thereof. For the reason, a slight difference is made between the taper angle of the tapered contact surface and the taper angle of the tapered seat surface. Thus, the tapered contact surface comes into contact with the tapered seat surface in a predetermined range from the outer peripheral end side in accordance with tightening axial force. That is, even if the tightening axial force varies somewhat, a portion of the outer peripheral end side is brought in secure contact. As the tightening axial force increases, the tapered contact surface bites into the tapered seat surface in a wider range, and the contact area of the contact portion increases. As described above, the contact area of the contact portion varies in accordance with the variation of the tightening axial force. Moreover, even the glow plug is in use, when the axial force acting on the contact portion varies in accordance with combustion pressure, the contact area of the contact portion also varies.

However, the contact area of the contact portion affects the function as the combustion pressure sensor. Accordingly, when the contact area varies due to the variation of the axial force of the glow plug with respect to the plug hole, it may be difficult to secure accuracy of a sensor output. The following will describe the problem.

The glow plug is configured to transmit strain in an axial direction of an engine head and a housing due to a variation in combustion pressure generated in the combustion chamber, via a load transfer member to a pressure detector. Load applied to the pressure detector varies depending on a ratio of rigidity of the engine head and rigidity of the glow plug between the tapered contact surface and the internal thread portion. That is, even in occurrence of the same combustion pressure, when the ratio of the rigidities is different, the load applied via the load transfer member to the pressure detector changes.

The rigidity of the glow plug between the tapered contact surface and the internal thread portion is also affected by the rigidity of the contact portion between the tapered contact surface and the tapered seat surface. The rigidity of the contact portion varies depending on the contact area between the tapered contact surface and the tapered seat surface.

Rigidity, or a spring constant k, is generally obtained by $k=(E*A)/L$. E denotes the Young's modulus, and L denotes a spring length, and A denotes a pressure receiving area. In the configuration of the contact portion described above, E corresponds to the Young's modulus of the engine head, L corresponds to the elastic deformation length of the contact portion, and A corresponds to the contact area of the contact portion.

Thus, the load applied to the pressure detector varies depending on the contact area of the contact portion. That is, as described above, when the contact area of the contact portion varies in accordance with the variation of the axial force of the glow plug with respect to the plug hole, the load applied to the pressure detector varies even if the combustion pressure is unchanged. Accordingly, change in the axial force causes the sensitivity of the combustion pressure sensor to vary.

Even the glow plug is in use, when the force acting on the contact portion varies in accordance with the combustion pressure, the contact area of the contact portion varies. That is, even the glow plug is in use, the sensitivity of the combustion pressure sensor varies. Therefore, the ratio of the output of the combustion pressure sensor with respect to the combustion pressure varies, the so-called linearity of the output may be hindered.

This may cause measurement errors of the combustion pressure by the combustion pressure sensor.

Therefore, in order to ensure the stability of the sensitivity and the linearity of the output, of the combustion pressure sensor, the variation of the contact area of the contact portion is required to be suppressed.

There is a possible approach to sufficiently increase the tightening axial force of the housing with respect to the plug hole to cause the tapered seat surface and the tapered contact surface to be in contact with each other along the entire surface, so that the contact area does not vary even if the axial force varies somewhat. However, this approach may be not a practical approach, because the axial force of the glow plug with respect to the plug hole has a limit.

The present disclosure is directed to providing an attachment structure of a glow plug, which has a combustion pressure sensor integrated therewith, configured to be attached to an internal combustion engine, and a glow plug with a combustion pressure sensor, each of which is capable of improving stability of sensitivity to combustion pressure, and linearity of output.

In accordance with an aspect of the disclosure, there is provided an attachment structure of a glow plug with a combustion pressure sensor. The glow plug with the combustion pressure sensor is configured to be attached to an internal combustion engine. The internal combustion engine includes a combustion chamber and a plug hole communicating with the combustion chamber. The plug hole has an inner wall surface, and the inner wall surface of the plug hole is formed with an internal thread portion and a seat portion located closer to the combustion chamber than the internal thread portion thereto, the seat portion protruding inward of the plug hole. The seat portion has a taper seat surface inclined to inwardly taper toward the combustion chamber. The glow plug with the combustion pressure sensor includes a cylindrical housing that is fixable to the plug hole, a glow heater that is held in the housing and protrudes toward the combustion chamber, and a load transfer member that is disposed inside the housing and transfers compression strain as a pressure. The compression strain is generated in the housing due to generation of a combustion pressure in the combustion chamber. The glow plug includes a pressure detector that detects the pressure received from the load transfer member. The housing includes an external thread portion screwed to the internal thread portion of the plug hole, and a seat facing portion formed on a tip side of the housing relative to the external thread and facing the seat portion of the plug hole in an axial direction.

The seat facing portion has a tapered contact surface in surface contact with the tapered seat surface. A recessed portion is formed in a radial portion of at least one of the seat facing portion and the seat portion, and is axially recessed to be in non-contact with the seat portion or the seat facing portion, and is formed annularly about a central axis of the housing.

In accordance with another aspect of the present disclosure, there is provided a glow plug with a combustion pressure sensor. The glow plug includes a cylindrical housing that is fixable to a plug hole communicating with a combustion chamber of an internal combustion engine, a glow heater that is held in an inside of a tip portion of the housing, and a load transfer member that is disposed inside the housing and transfers compression strain as a pressure. The compression strain is generated in the housing due to generation of combustion pressure in the combustion chamber. The glow plug includes a pressure detector that detects the pressure received from the load transfer member.

An internal thread portion and a seat portion are formed in an inner wall surface of the plug hole. The seat portion is located closer to the combustion chamber than the internal thread portion thereto, and the seat portion protrudes inward of the plug hole. The seat portion has a taper seat surface inclined to inwardly taper toward the combustion chamber. The housing includes an external thread portion screwed to the internal thread portion of the plug hole, and a seat facing portion formed on a tip side of the housing relative to the external thread and facing the seat portion of the plug hole in an axial direction. The seat facing portion has a tapered contact surface in surface contact with the tapered seat surface, and a recessed portion axially recessed to be in non-contact with the seat portion or the seat facing portion. Each of the tapered contact surface and the recessed portion is formed annularly about a central axis of the housing.

In the attachment structure of the glow plug with the combustion pressure sensor, the recessed portion is formed in a radial portion of at least one of the seat facing portion and the seat portion. Accordingly, the configuration can suppress the contact area of the contact portion between the seat facing portion and the seat portion (hereinafter referred to merely as contact portion) from varying by the axial force of the housing with respect to the plug hole.

First Embodiment

The following will describe an attachment structure of a glow plug with a combustion pressure sensor and the glow plug with the combustion pressure sensor, according to first embodiment with reference to FIGS. 1 to 4.

As shown in FIG. 1, an attachment structure 10 of a glow plug 1 with a combustion pressure sensor according to the present embodiment is configured such that the glow plug 1 is attached to an internal combustion engine 7. The attachment structure 10 of the glow plug with the combustion pressure sensor is referred to as attachment structure 10 as appropriate below. The glow plug 1 with the combustion pressure sensor is referred to as glow plug 1 as appropriate below.

The internal combustion engine 7 has a combustion chamber 71 and a plug hole 72 communicating with the combustion chamber 71.

An inner wall surface of the plug hole 72 is formed with an internal thread portion 73 and a seat portion 74. The seat portion 74 is located closer to the combustion chamber 71 than the internal thread portion 73 thereto, and protrudes inward of the plug hole 72.

Figure 3:
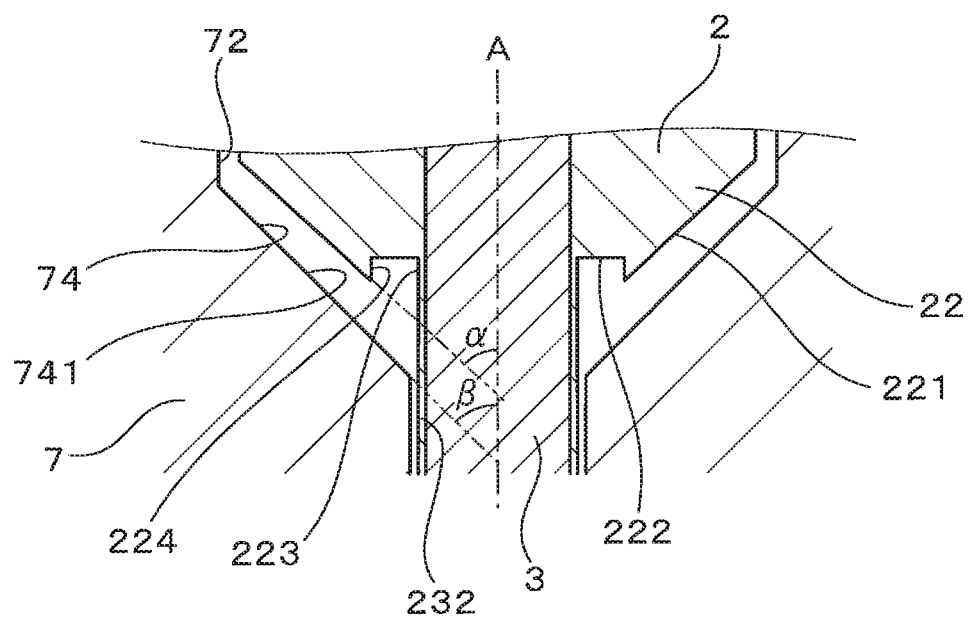
FIG. 3 is a cross-sectional explanatory view of showing a state before being brought into contact between the seat portion and the seat facing portion in the first embodiment.

As shown in FIG. 3, the seat portion 74 has a tapered seat surface 741 inclined to inwardly taper toward the combustion chamber 71.

As shown in FIG. 1, the glow plug 1 includes a cylindrical housing 2, a glow heater 3, a load transfer member 4, and a pressure detector 5. The housing 2 is fixed to the plug hole 72. The glow heater 3 is held by the housing 2 and protrudes into the combustion chamber 71. The load transfer member 4 is disposed inside the housing 2 and transfers compressive strain of the housing 2 as a pressure; the compression strain is generated in the housing 2 due to generation of a generated combustion pressure in the combustion chamber 71. The pressure detector 5 detects the pressure received from the load transfer member 4.

The housing 2 has an external thread portion 21 and a seat facing portion 22. The external thread portion 21 is screwed to the internal thread portion 73 of the plug hole 72. The seat facing portion 22 is formed on a tip side of the housing 2 relative to the external thread 21 and faces the seat portion 74 of the plug hole 72 in the axial direction.

Figure 2:
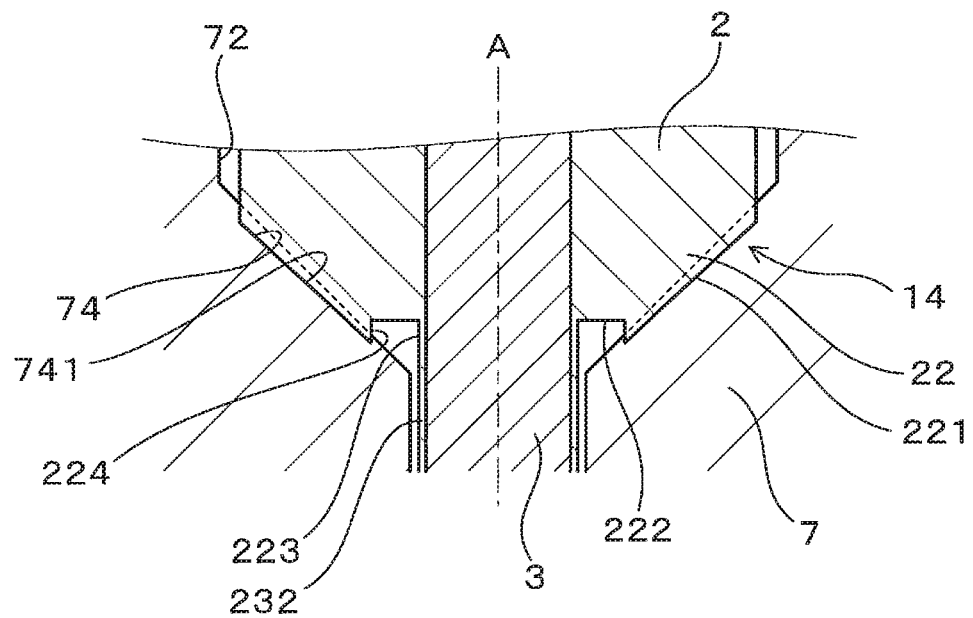
FIG. 2 is a cross-sectional explanatory view of showing a vicinity of a contact portion between a seat portion and a seat facing portion in the first embodiment.

As shown in FIGS. 2 and 3, the seat facing portion 22 has a tapered contact surface 221 in surface contact with the tapered seat surface 741. A broken line shown in FIG. 2 shows the tapered seat surface 741 before the glow plug 1 is fastened to the plug hole 72. As described later, when the glow plug 1 is fastened to the plug hole 72, the seat facing portion 22 bites into the seat portion 74, so that the tapered seat surface 741 sinks.

Figure 4:
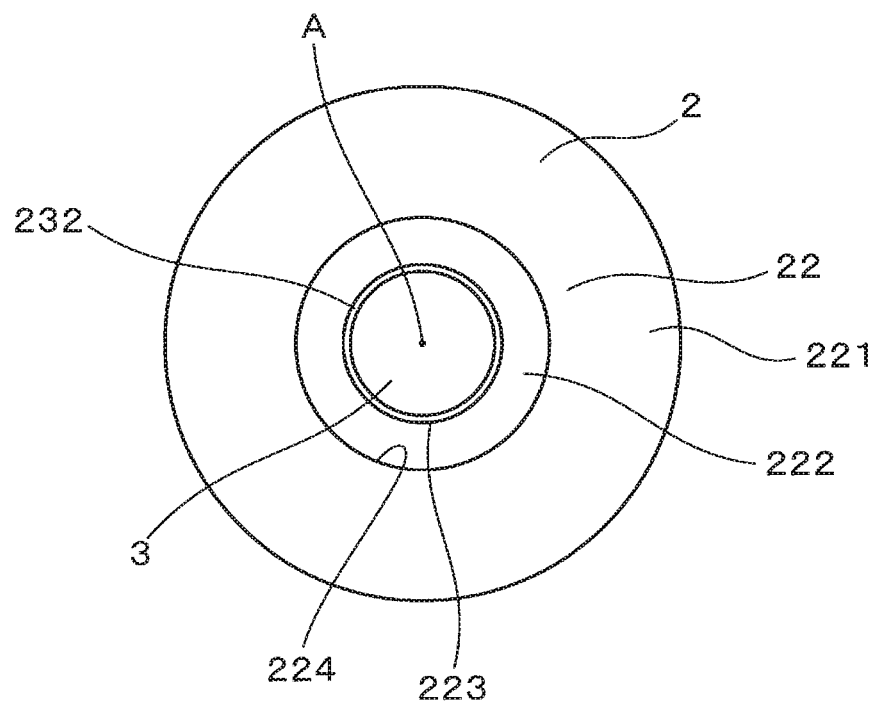
FIG. 4 is a plan explanatory view of showing the seat facing portion viewed from a tip side in the axial direction in the first embodiment.

A recessed portion 222 is formed in an inner periphery of the seat facing portion 22, and is axially recessed to be in non-contact with the seat portion 74. As shown in FIG. 4, the recessed portion 222 is formed annularly about a central axis A of the housing 2.

The following will specifically describe the glow plug 1 and the attachment structure 10, according to the present embodiment.

As shown in FIG. 1, the glow plug 1 is disposed in the plug hole 72 so that a tip portion of the glow heater 3 protrudes into the combustion chamber 71 of the internal combustion engine 7. The glow plug 1 with the combustion pressure sensor in the present embodiment has both a function as a glow plug and a function as a combustion pressure sensor. That is, the glow plug 1, which serves as a glow plug, is operative to preheat a fuel mixture in the combustion chamber 71 based on heat generated by the glow heater 3. The glow plug 1, serves as a compression sensor, is operative to measure a combustion pressure in the combustion chamber 71 using, for example, the pressure detector 5.

The seat facing portion 22 in a tip portion of the housing 2 is brought into contact with the seat portion 74, and the external thread portion 21 formed on a base end side of the housing 2 is screwed to the internal thread portion 73, so that the glow plug 1 is attached to the plug hole 72. One side of the glow plug 1 adjacent to the combustion chamber 71 of the internal combustion engine 7 is referred to as tip side, and the other side of the glow plug 1, which is opposite to the tip side, is referred to as base end side.

The housing 2 is comprised of a first housing segment 201, a second housing segment 202, and a third housing segment 203, which are connected to each other in the axial direction of the housing 2. The first housing segment 201, which is most adjacent to the tip side among the three housing segments, is formed with the seat facing portion 22. The third housing segment 203, which is most adjacent to the base end side among the three housing segments, is formed with the external thread portion 21.

The first housing segment 201 is formed in a cylindrical shape and holds the glow heater 3 inside thereof. The first housing segment 201 includes an annular thickened portion 231 and a cylindrical thinned portion 232 that is disposed on the tip side of the thickened portion 231 and has a smaller outer diameter than the thickened portion 231. The tip portion of the glow heater 3 protrudes from the tip side of the first housing segment 201.

The second housing segment 202 is formed in a cylindrical shape. A portion of a conductive wire 11 passes through the inside of the second housing segment 202.

The third housing segment 203 is formed in a cylindrical shape. The conductive wire 11 and the load transfer member 4 pass through the inner periphery of the third housing segment 203.

The plug hole 72 is bored in the head of the internal combustion engine 7. The plug hole 72 has a tip side portion 721 open to the combustion chamber 71 and a base end side portion 722 open to the outside of the internal combustion engine. The tip side portion 721 is smaller in diameter than the base end side portion 722. The seat portion 74 is formed on the inner wall surface of the plug hole 72 between the tip side portion 721 and the base end side portion 722.

The head of the internal combustion engine 7 is made of an aluminum alloy. On the other hand, the housing 2 is made of an iron alloy such as stainless steel. The materials of the engine head and the housing 2 are not limited to the above materials. It is noted that the Vickers hardness of the housing 2 is greater than that of the engine head.

The glow heater 3 generates heat when energized through the conductive wire 11, thus heating the fuel mixture in the combustion chamber 71. As shown in FIG. 1, the conductive wire 11 is disposed at the inside of the housing 2. The conductive wire 11 has a base end portion connected to a lead wire 12 connected to an external power supply.

As shown in FIG. 1, the load transfer member 4 is disposed at the inside of the housing 2. The conductive wire 11 is inserted through the inside of the load transfer member 4. The load transfer member 4 includes a first load transfer member 41 having a long cylindrical shape and a second load transfer member 42 disposed on the base end side of the first load transfer member 41.

A tip of the first load transfer member 41 is in contact with a base end of the second housing segment 202. The second load transfer member 42 is interposed between the pressure detector 5 and the first load transfer member 41. That is, the load transfer member 4 constituted by the first load transfer member 41 and the second load transfer member 42 is interposed between the second housing segment 202 and the pressure detector 5 in the axial direction. Thus, the load transfer member 4 is configured to be capable of transferring strain of the housing 2 to the pressure detector 5.

The pressure detector 5 is comprised of a piezoelectric element. The pressure detector 5 is configured to convert a pressure acting on the piezoelectric element in the axial direction via the load transfer member 4 into a voltage and output the voltage. That is, strain of the engine head and the housing 2, caused by the combustion pressure in the combustion chamber 71 is transferred via the load transfer member 4 to the pressure detector 5 as a pressure. The pressure detected by the pressure detector 5 is converted into a voltage, and the voltage is outputted. The output is amplified by an internal amplifier circuit and then is taken out through a lead wire 13. Thus, the glow plug 1 in the present embodiment performs the function as the combustion pressure sensor.

The glow plug 1 in the present embodiment suppresses variation of a contact area between the seat portion 74 of the plug hole 72 and the seat facing portion 22 of the glow plug 1 in order to perform the function of the combustion pressure sensor accurately. For the reason, as described above, the glow plug 1 in the present embodiment has the recessed portion 222 in the seat facing portion 22.

That is, as shown in FIGS. 2 and 3, the seat facing portion 22 includes the tapered contact surface 221 in surface contact with the tapered seat surface 741 of the seat portion 74, and also includes the recessed portion 222 that is recessed in the axial direction so as not to come into contact with the seat portion 74. As shown in FIG. 4, the tapered contact surface 221 and the recessed portion 222 are respectively formed annularly and concentrically about the central axis A of the housing 2 as the center.

The recessed portion 222 is formed in a radial end portion of the seat facing portion 22. In particular, in the present embodiment, the recessed portion 222 is formed in an inner periphery of the seat facing portion 22. That is, the recessed portion 222 is formed annularly so as to be disposed along an outer peripheral surface of the thinned portion 232 of the first housing segment 201. The recessed portion 222 is formed in a groove shape so as to be recessed toward the base end side in the axial direction. The recessed portion 222 has formed an inner peripheral wall surface 223 and an outer peripheral wall surface 224 that are parallel to the axial direction.

As shown in FIG. 3, a taper angle $\alpha$ of the tapered contact surface 221 is set slightly greater than a taper angle $\beta$ of the tapered seat surface 741. The taper angle $\alpha$ is an acute angle formed by the central axis A and the tapered contact surface 221 in a cross-sectional shape of a plane including the central axis A of the glow plug 1. The taper angle $\beta$ is an acute angle formed by the central axis A and the tapered seat surface 741 in a cross-sectional shape of a plane including the central axis A of the plug hole 72.

The angular difference between the taper angle $\alpha$ and the taper angle $\beta$ is provided to ensure a gas sealing property in a contact portion 14 between the seat portion 74 and the seat facing portion 22. In the present embodiment, the taper angles α and β are similar to those in an attachment structure of a general glow plug. For example, α may be 46.5°±0.5°, and β may be 45°±0.5°, and α−β may be 0.5 to 2.5°.

The following will describe the operation and effect in the present embodiment.

In the above-described attachment structure 10 of the glow plug with the combustion pressure sensor, the recessed portion 222 is formed in the seat facing portion 22. The configuration can suppress a contact area of the contact portion from varying by axial force of the housing 2 with respect to the plug hole 72.

That is, regardless of the above-described axial force, the recessed portion 222 serves as a portion where the contact between the seat facing portion 22 and the seat portion 74 is avoided. On the other hand, a facing area of a remaining portion of the seat facing portion 22 other than the recessed portion 222, which faces a corresponding portion of the seat portion 74, is reduced. Therefore, axial force for bringing all the regions other than the recessed portion 222, in the seat facing portion 22 and the seat portion 74 into contact with each other can be relatively reduced.

Thus, even if the axial force is not particularly increased, the tapered seat surface 741 and the tapered contact surface 221 can be entirely brought into contact with each other. On the other hand, even if the axial force is increased somewhat, it is possible to avoid the recessed portion 222 and the portion facing the recessed portion 222 from contacting with each other. Therefore, even if the axial force varies somewhat, the contact area between the seat portion 74 and the seat facing portion 22 can be kept constant. In addition, even if the axial force acting on the contact portion 14 varies with a change of the combustion pressure, the contact area of the contact portion 14 can be prevented from varying.

As a result, rigidity of the contact portion 14 is stabilized, so that stability of sensitivity of the combustion pressure sensor with respect to the combustion pressure and linearity of output of the combustion pressure sensor can be improved.

The following will further describe the above-described operations and effects with reference to FIGS. 5 to 11.

Figure 5:
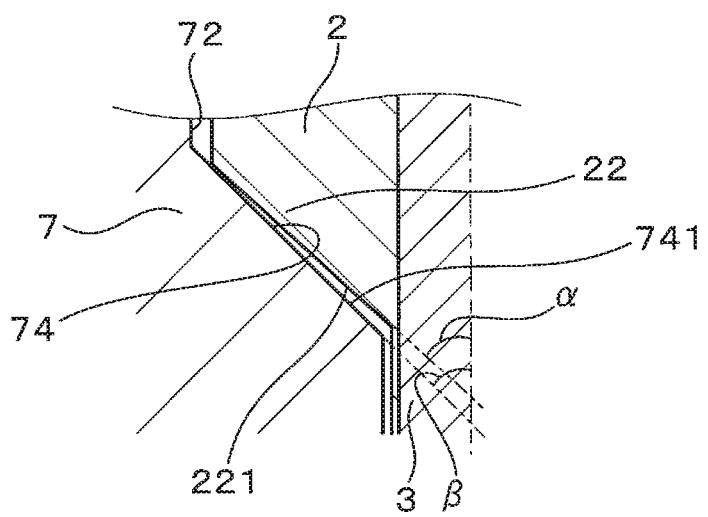
FIG. 5 is a cross-sectional explanatory view of showing a vicinity of a contact portion between a seat portion and a seat facing portion in a state immediately before axial force is applied in a comparative embodiment.
Figure 6:
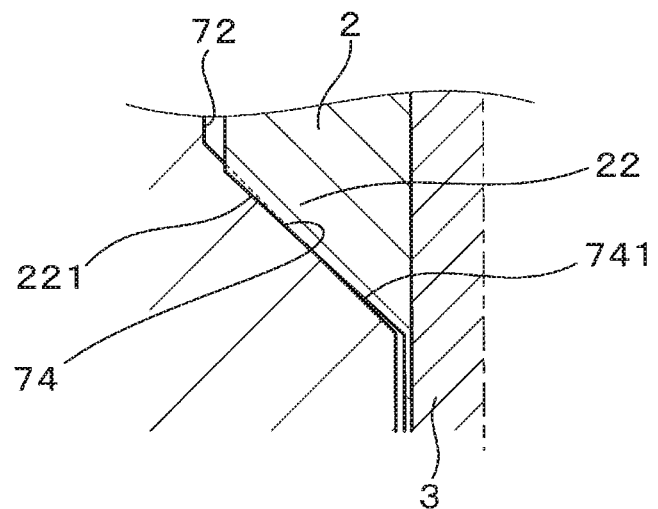
FIG. 6 is a cross-sectional explanatory view of showing the vicinity of the contact portion between the seat portion and the seat facing portion in a state in which the axial force of a lower limit value is applied in the comparative embodiment.
Figure 7:
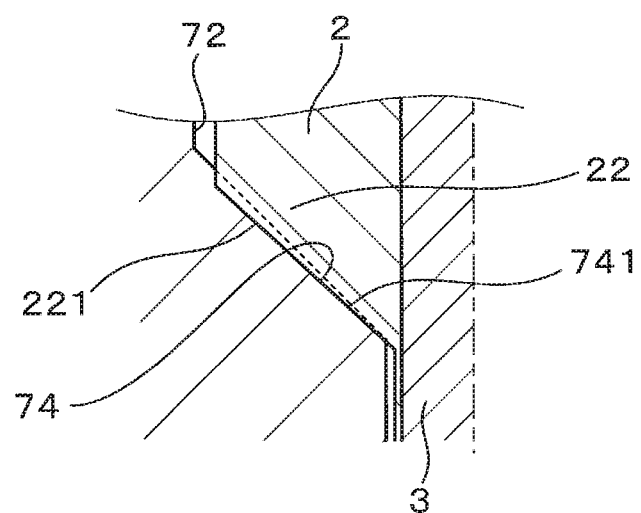
FIG. 7 is a cross-sectional explanatory view of showing the vicinity of the contact portion between the seat portion and the seat facing portion in a state in which the axial force of an upper limit value is applied in the comparative embodiment.

As shown in FIGS. 5 to 7, the following describes a comparison example in which the seat portion 74 and the seat facing portion 22 are brought into contact with each other without providing a recessed portion, the contact area varies depending on axial force. That is, as described above, the taper angle α of the tapered contact surface 221 of the seat facing portion 22 is greater than the taper angle β of the tapered seat surface 741 of the seat portion 74. Therefore, as shown in FIG. 5, the seat facing portion 22 comes into contact with the seat portion 74 from an outer peripheral end thereof.

Then, as shown in FIG. 6, as the axial force increases, the seat facing portion 22 partly bites into the seat portion 74. At the time, though the seating portion 74 bites into the seat portion 74 in order from the outer peripheral end of the seat facing portion 22, a portion that fails to partially contact with the seat portion 74, is present on the inner peripheral side of the seat facing portion 22.

As shown in FIG. 7, when the axial force further increases, the seat facing portion 22 largely bites into the seat portion 74, so that the contact area also increases.

Thus, the contact area between the seat facing portion 22 and the seat portion 74 varies depending on the variations of the axial force. As an attachment condition of the glow plug to the plug hole 72, an upper limit value and a lower limit value of the axial force are generally determined by tightening torque control. Therefore, the case of tightening at the lower limit value and the case of tightening at the upper limit value are also assumed.

For example, when the state of being tightened with the axial force at the lower limit value is the state shown in FIG. 6 and the state of being tightened with the axial force at the upper limit value is the state shown in FIG. 7, the contact area of the contact portion varies depending on how the glow plug 1 is attached. As a result, the sensitivity of the combustion pressure sensor with respect to the combustion pressure may vary.

In contrast, in the case in which the recessed portion 222 is provided as in the glow plug 1 in the present embodiment, even if the axial force varies within a predetermined range, variations of the contact area can be prevented.

Figure 8:
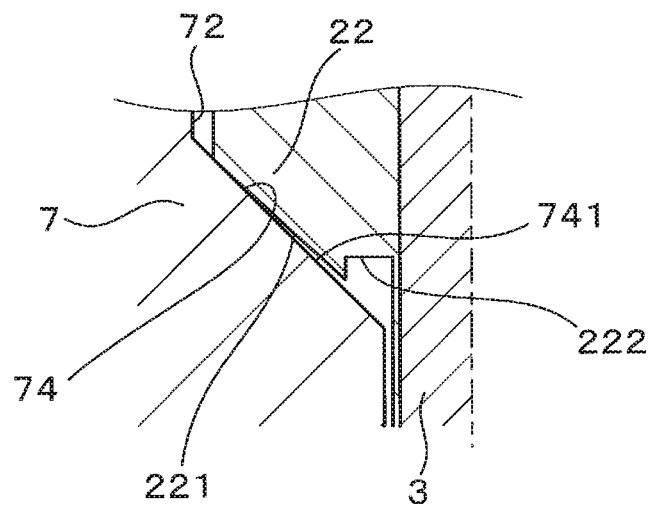
FIG. 8 is a cross-sectional explanatory view of showing a vicinity of the contact portion between the seat portion and the seat facing portion in a state immediately before axial force is applied in the first embodiment.
Figure 9:
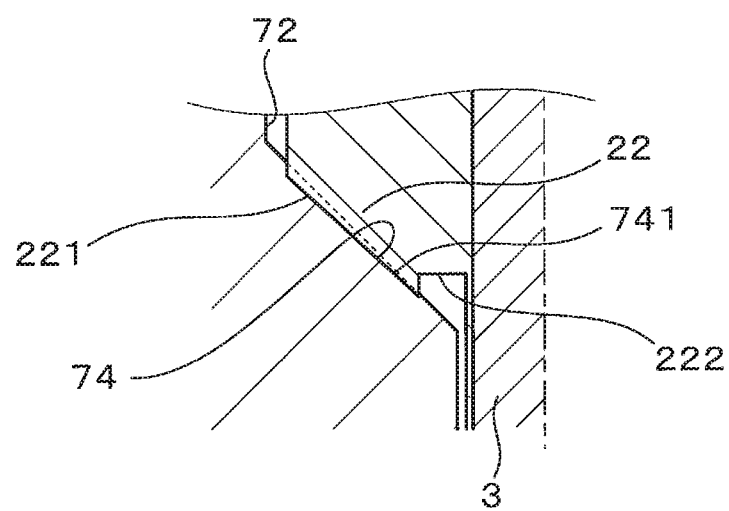
FIG. 9 is a cross-sectional explanatory view of showing the vicinity of the contact portion between the seat portion and the seat facing portion in a state in which the axial force of a lower limit value is applied in the first embodiment.

That is, as shown in FIG. 8, when the axial force increases from the state in which the outer peripheral end of the seat facing portion 22 contacts with the seat portion 74, the seat facing portion 22 bites into the seat portion 74 in order from the outer peripheral end thereof, as described above. However, since the recessed portion 222 is provided in a radial portion of the seat facing portion 22, the area of the tapered contact surface 221 is relatively small. Therefore, the entire surface of the tapered contact surface 221 contacts with the seat portion 74 with a relatively small axial force. That is, for example, in the state in which the tightening is performed with the axial force at the lower limit value in the above-described attachment condition, the entire surface of the tapered contact surface 221 comes into contact with the seat portion 74 as shown in FIG. 9. At the time, the recessed portion 222 fails to be naturally in contact with the seat portion 74.

Figure 10:
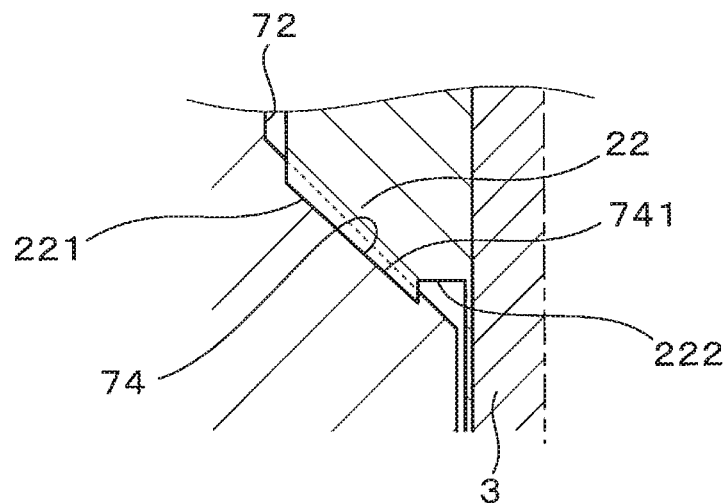
FIG. 10 is a cross-sectional explanatory view of showing the vicinity of the contact portion between the seat portion and the seat facing portion in a state in which the axial force of an upper limit value is applied in the first embodiment.

Furthermore, when the axial force increases from the above-described state, as shown in FIG. 10, the seat facing portion 22 further bites into the seat portion 74 while the recessed portion 222 is maintained to be non-contact with the seat portion 74. Naturally, the tapered contact surface 221 is kept in entirely contact with the seat portion 74. That is, even if the axial force varies within a predetermined range, as shown in FIGS. 9 and 10, the contact area between the seat portion 74 and the seat facing portion 22 is kept unchanged. As a result, the sensitivity of the combustion pressure sensor with respect to combustion pressure can be prevented from varying. It is noted that the contact area of the contact portion accurately means a projected area of the contact surface when being projected onto the axial direction. Therefore, even if the area of the contact surface parallel to the axial direction increases, the sensor sensitivity is little affected.

Figure 11:
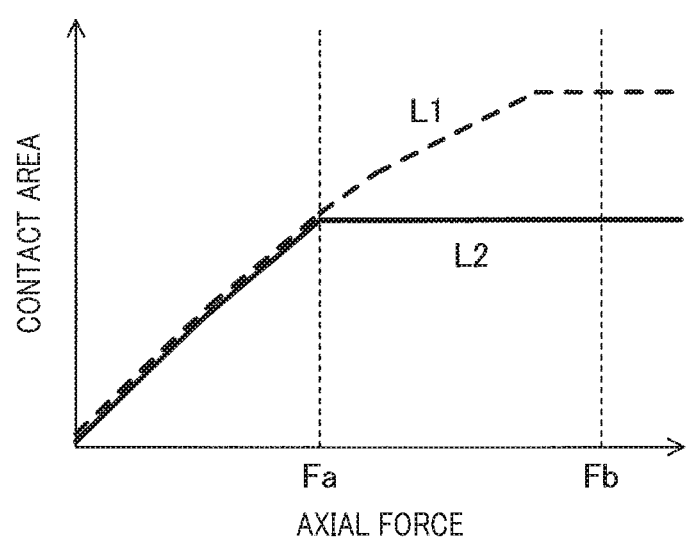
FIG. 11 is a diagram showing the relationship between axial force and a contact area of a contact portion.

As described above, in the glow plug with no recessed portion of the comparative example, as shown by a broken line L1 in FIG. 11, even in a region where the axial force is equal to or greater than a lower limit value Fa in the attachment condition, the contact area of the contact portion increases as the axial force increases. That is, even in the range of the attachment condition, the contact area of the contact portion varies in accordance with the axial force.

In contrast, as shown by a solid line L2 in FIG. 11, when the axial force is at least equal to or greater than the lower limit value Fa in the attachment condition, the glow plug 1 in the present embodiment enables the contact area of the contact portion 14 to be kept unchanged. In FIG. 11, Fb denotes the axial force acting on the contact portion when the combustion pressure becomes maximum in the state in which the glow plug is attached with the fastening axial force having the upper limit value in the attachment condition.

When the width and depth of the recessed portion 222 are actually designed, the attachment condition of the glow plug 1 is taken into consideration. That is, even if the axial force varies in a region where the axial force is equal to or greater than the lower limit value in the attachment condition, the contact area is designed to be kept unchanged. In other words, when the glow plug 1 is attached to the plug hole 72 with the axial force having the lower limit value, the width of the recessed portion 222 is determined so that the entire surface of the tapered contact surface 221 comes into contact with the tapered seat surface 741. In the state in which the glow plug 1 is attached with the axial force having the upper limit value in the attachment condition, when the combustion pressure becomes maximum, the depth of the recessed portion 222 is set so that the recessed portion 222 is kept to be in non-contact with the tapered seat surface 741. Thus, the stability of the sensitivity of the combustion pressure sensor with respect to the combustion pressure and the linearity of the output of the combustion pressure sensor can be secured.

In the present embodiment, the recessed portion 222 is provided in the seat facing portion 22 of the glow plug 1. Therefore, the above-described operations and effects can be obtained without providing a recessed portion in the seat portion 74 of the plug hole 72.

The recessed portion 222 is formed at the inner periphery of the seat facing portion 22. Thus, since an outer diameter of the contact portion between the seat facing portion 22 and the seat portion 74 can be increased, the attachment stability of the glow plug 1 to the plug hole 72 can be easily improved.

As described above, the present embodiment can provide the attachment structure of the glow plug with the combustion pressure sensor and the glow plug with the combustion pressure sensor, each of which is capable of improving the stability of the sensitivity of the combustion pressure sensor with respect to the combustion pressure and the linearity of the output of the combustion pressure sensor.

Second Embodiment

Figure 12:
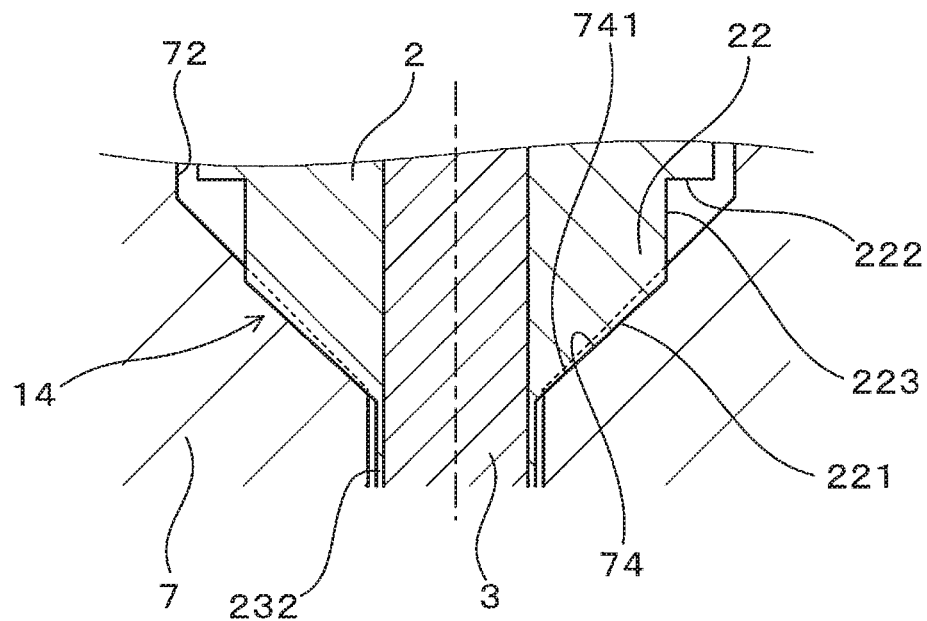
FIG. 12 is a cross-sectional explanatory view of showing a vicinity of a contact portion between a seat portion and a seat facing portion in a second embodiment.
Figure 13:
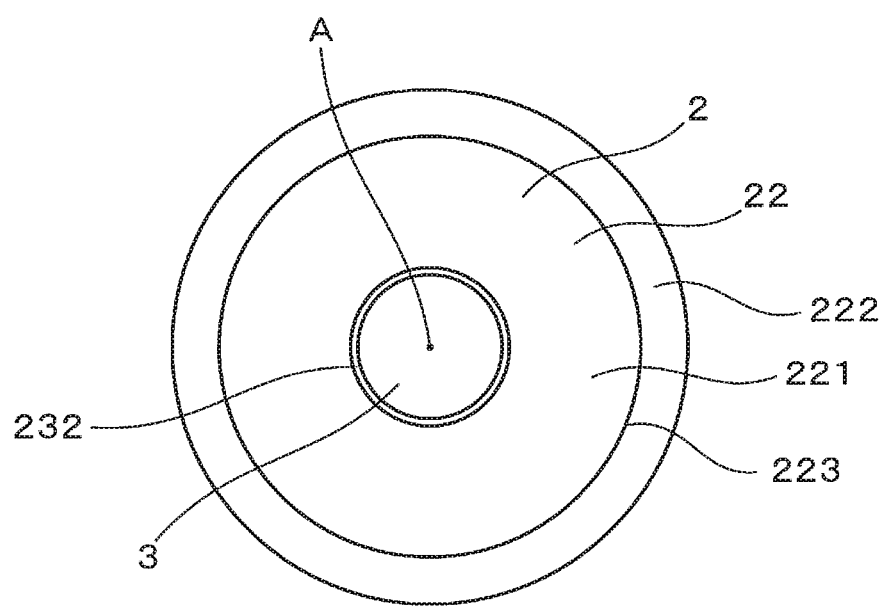
FIG. 13 is a plan explanatory view of showing the seat facing portion viewed from a tip side in an axial direction in second the embodiment.

In the glow plug 1 with the combustion pressure sensor, in the present embodiment, as shown in FIGS. 12 and 13, the recessed portion 222 is formed in an outer periphery of the seat facing portion 22.

That is, the seat facing portion 22 has the tapered contact surface 221 on the inner peripheral side thereof and the recessed portion 222 on the outer peripheral side thereof. The tapered contact surface 221 is disposed adjacent to an outer peripheral side of the thinned portion 232. The recessed portion 222 has a stepped shape instead of the groove shape shown in the first embodiment. That is, though the recessed portion 222 has the inner peripheral wall surface 223 on the inner peripheral side thereof, the outer peripheral side is open. The inner peripheral wall surface 223 on the inner peripheral side of the recessed portion 222 is formed parallel to the axial direction.

In the attachment structure 10 in which the glow plug 1 is attached to the internal combustion engine 7, the entire surface of the tapered contact surface 221 contacts with the seat portion 74 of the plug hole 72 while the recessed portion 222 is in non-contact with the seat portion 74. The tapered contact surface 221 is only a portion facing the seat portion 74 in the axial direction. A portion of the tapered contact surface 221, which faces a portion of the housing 2 disposed inward relative to the seat portion 74, is excluded from the tapered contact surface 221. The portion excluded from the tapered contact surface 221 is naturally kept non-contact with the seat portion 74.

Other configurations are the same as those in the first embodiment.

In the reference numerals used in the second embodiment and subsequent embodiments, the same reference numerals as those used in the already-described embodiments represent the same constituent elements as in the already-described embodiments unless otherwise indicated.

According to the present embodiment, an outer diameter of the tapered contact surface 221 can be decreased. Therefore, even if an axial misalignment of the glow plug 1 with respect to the plug hole 72 occurs slightly, the influence based on the misalignment on the contact area in the contact portion 14 can be reduced.

The present embodiment has the other operations and effects identical to those of the first embodiment.

Third Embodiment

Figure 14:
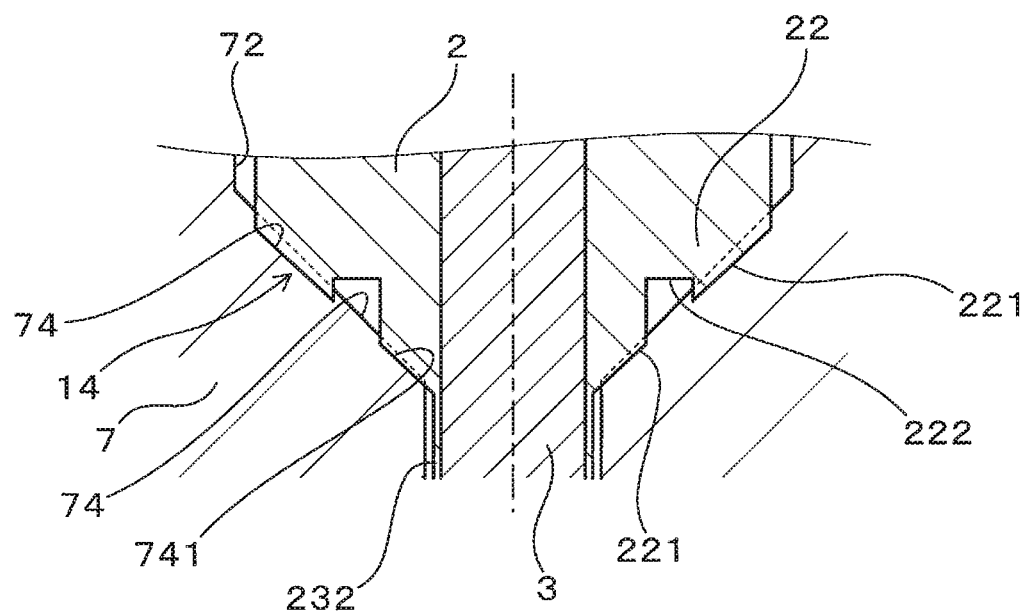
FIG. 14 is a cross-sectional explanatory view of showing a vicinity of a contact portion between a seat portion and a seat facing portion in a third embodiment.
Figure 15:
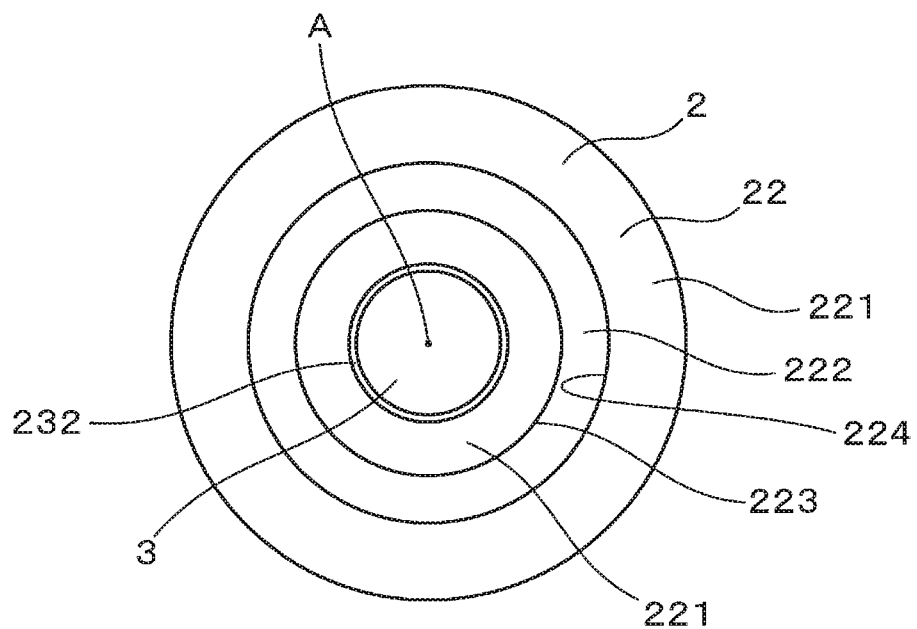
FIG. 15 is a plan explanatory view of showing the seat facing portion viewed from a tip side in an axial direction in the third embodiment.

In the glow plug 1 with the combustion pressure sensor in the present embodiment, as shown in FIGS. 14 and 15, the recessed portion 222 is formed inside the outer periphery of the seat facing portion 22, and the recessed portion 222 is also formed outside the inner periphery of the seat facing portion 22.

That is, tapered contact surfaces 221 are formed at respective two radial portions of the seat facing portion 22. The tapered contact surfaces 221 are formed on both of the inner peripheral side and the outer peripheral side of the recessed portion 222.

Other configurations are the same as those in the first embodiment.

According to the present embodiment, the inner peripheral side of the seat facing portion 22 is in contact with the seat portion 74, and the outer peripheral side of the seat facing portion 22 is also in contact with the seat portion 74. This enables the glow plug 1 to be more stably fixed to the plug hole 72.

Other than the above, the present embodiment has the same operation and effect as the first embodiment.

The recessed portions 222 may be respectively provided at a plurality of radial portions of the seat facing portion 22, and the tapered contact surfaces 221 may be respectively provided at three or more portions of the seat facing portion 22.

Fourth Embodiment

Figure 16:
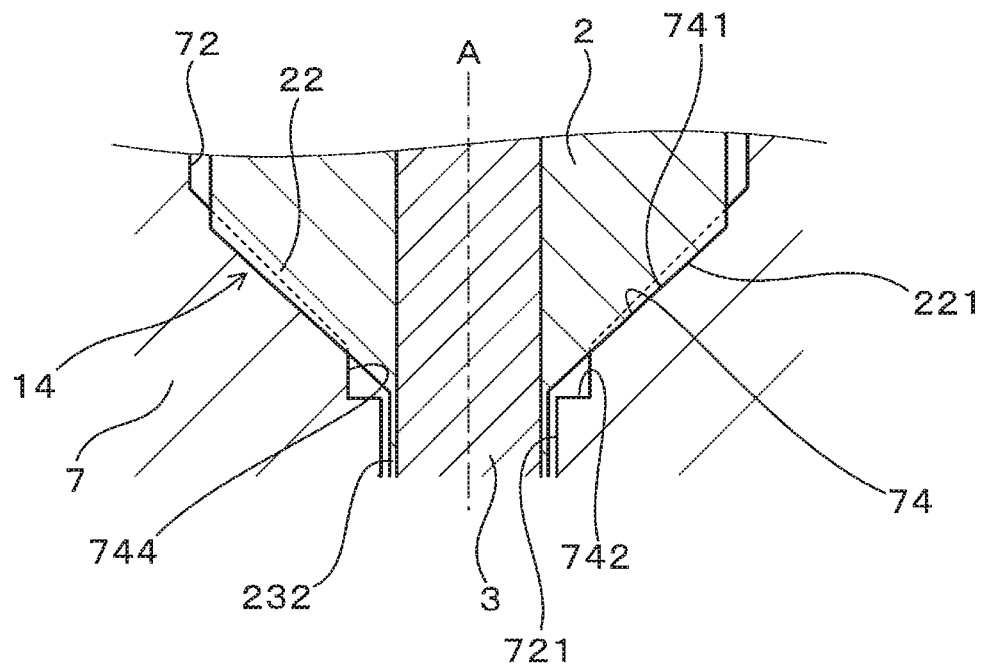
FIG. 16 is a cross-sectional explanatory view of showing a vicinity of a contact portion between a seat portion and a seat facing portion in a fourth embodiment.
Figure 17:
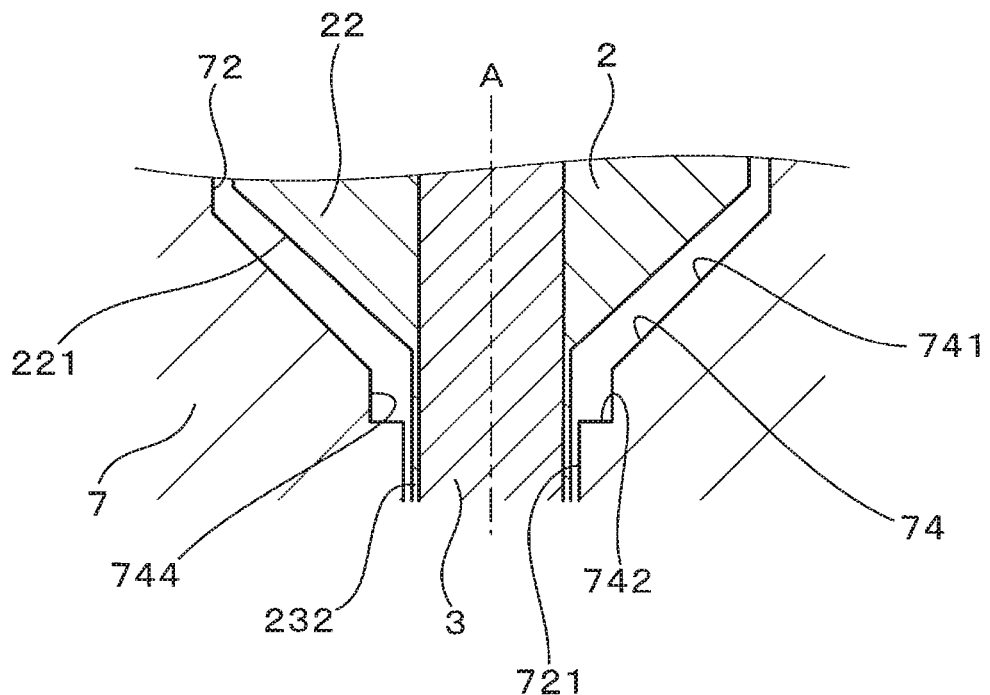
FIG. 17 is a cross-sectional explanatory view of showing a state before contact between the seat portion and the seat facing portion in the fourth embodiment.
Figure 18:
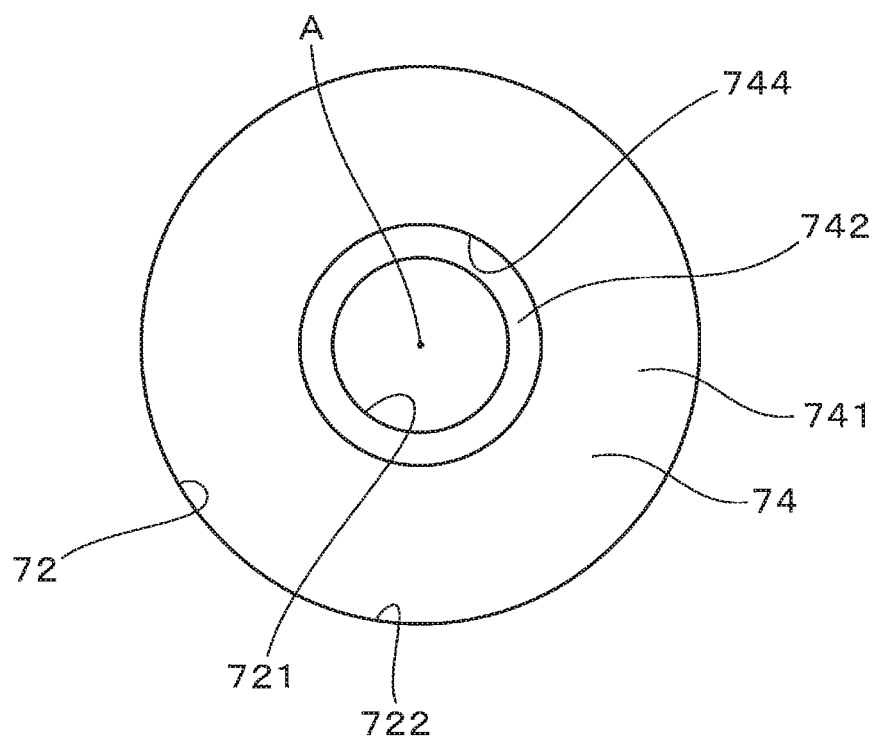
FIG. 18 is a plan explanatory view of showing the seat facing portion viewed from a tip side in an axial direction in the fourth embodiment.

In the glow plug 1 with the combustion pressure sensor in the present embodiment, as shown in FIGS. 16, 17, and 18, a recessed portion 742 is provided in the seat portion 74 of the internal combustion engine 7.

That is, the recessed portion 742 is formed in a portion of the seat portion 74 of the plug hole 72, and is axially recessed to be in non-contact with the seat facing portion 22 of the glow plug 1. The recessed portion 742 is formed annularly in an inner periphery of the seat portion 74.

The recessed portion 742 is formed annularly so as to be disposed adjacent to an outer peripheral side of the tip side portion 721 of the plug hole 72. The tapered seat surface 741 is formed on the outer peripheral side of the recessed portion 742 of the seat portion 74.

The recessed portion 742 has an outer peripheral wall surface 744 on the outer peripheral side. The outer peripheral wall surface 744 is formed parallel to the axial direction.

Other configurations are the same as those in the first embodiment.

In the case of the present embodiment, the glow plug 1 does not need to provide the recessed portion 222.

Other than the above, the present embodiment has the same operation and effect as the first embodiment.

Fifth Embodiment

Figure 19:
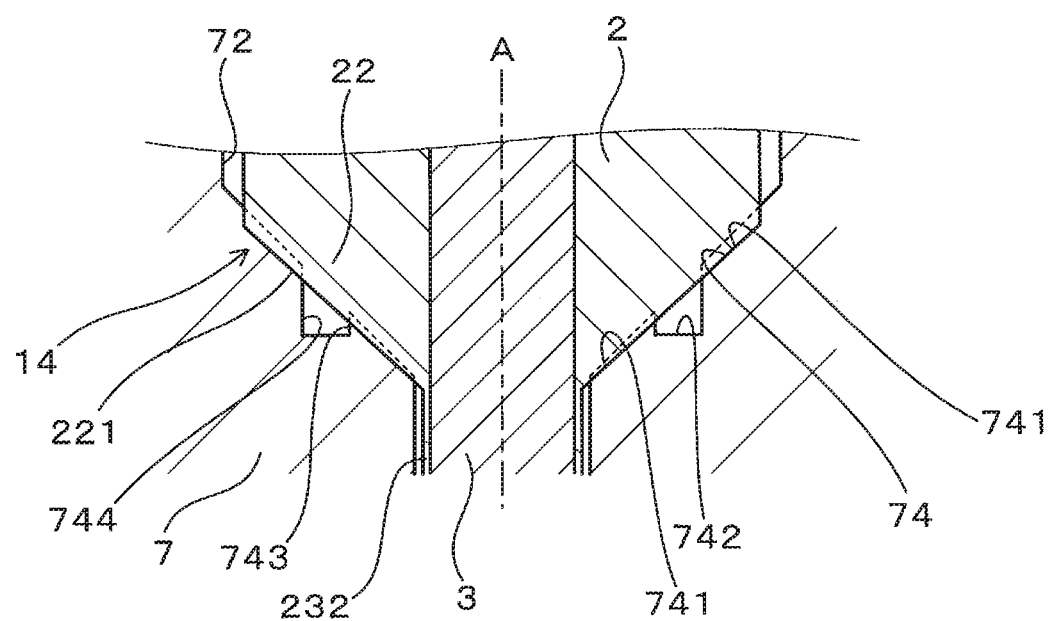
FIG. 19 is a cross-sectional explanatory view of showing a vicinity of a contact portion between a seat portion and a seat facing portion in a fifth embodiment.
Figure 20:
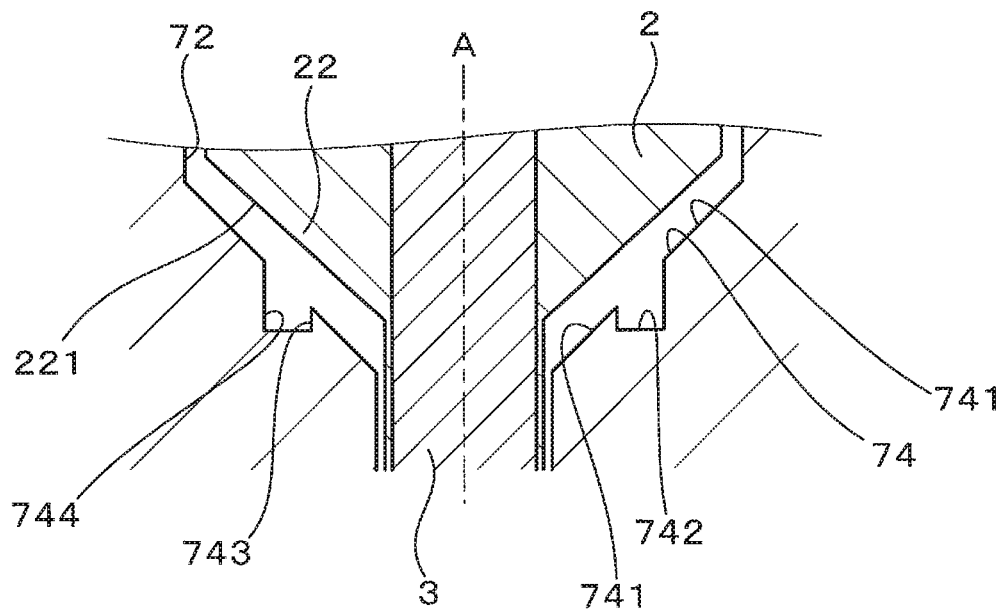
FIG. 20 is a cross-sectional explanatory view of showing a state before contact between the seat portion and the seat facing portion in the fifth embodiment.
Figure 21:
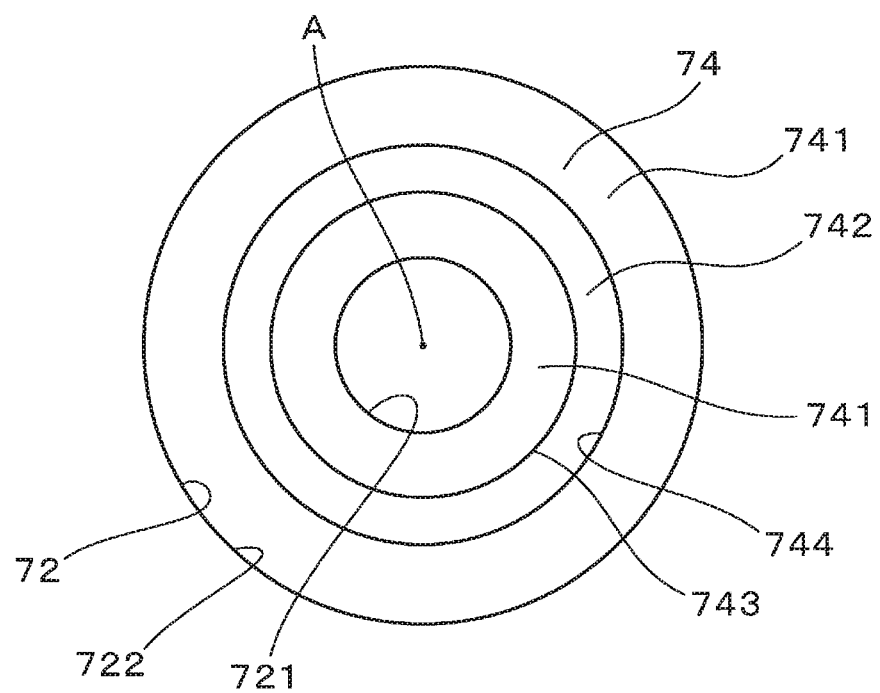
FIG. 21 is a plan explanatory view of the seat facing portion viewed from a tip side in an axial direction in the fifth embodiment.

In the glow plug 1 with the combustion pressure sensor in the present embodiment, as shown in FIGS. 19, 20, and 21, the recessed portion 742 is formed inside the outer periphery of the seat portion 74, and the recessed portion 742 is also formed outside the inner peripheral portion of the seat portion 74.

That is, the tapered seat surfaces 741 is formed at respective two radial portions of the seat portion 74. The tapered seat surfaces 741 are formed on both of the inner peripheral side and the outer peripheral side of the recessed portion 742. The recessed portion 742 is formed in an annular groove shape. The recessed portion 742 has formed an inner peripheral wall surface 743 on the inner peripheral side thereof, and an outer peripheral wall surface 744 on the outer peripheral side thereof that are parallel to the axial direction.

Other configurations are the same as those in the fourth embodiment.

According to the present embodiment, the inner peripheral side of the seat portion 74 is in contact with the seat facing portion 22, and the outer peripheral side of the seat portion 74 is also in contact with the seat facing portion 22. This enables the glow plug 1 to be more stably fixed to the plug hole 72.

Other than the above, the present embodiment has the same operation and effect as the fourth embodiment.

The recessed portion 742 may be configured to be provided at a plurality of portions of the seat portion 74 in the radial direction, and the tapered seat surface 741 may be configured to be provided at three or more portions of the seat portion 74 in the radial direction.

Sixth Embodiment

Figure 22:
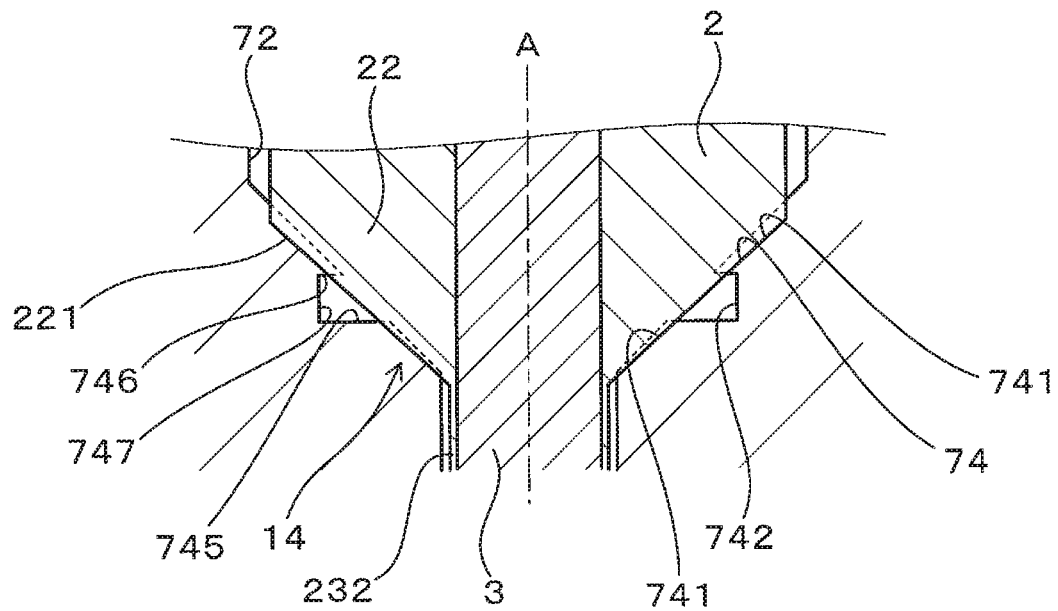
FIG. 22 is a cross-sectional explanatory view of showing a vicinity of a contact portion between a seat portion and a seat facing portion in a sixth embodiment.
Figure 23:
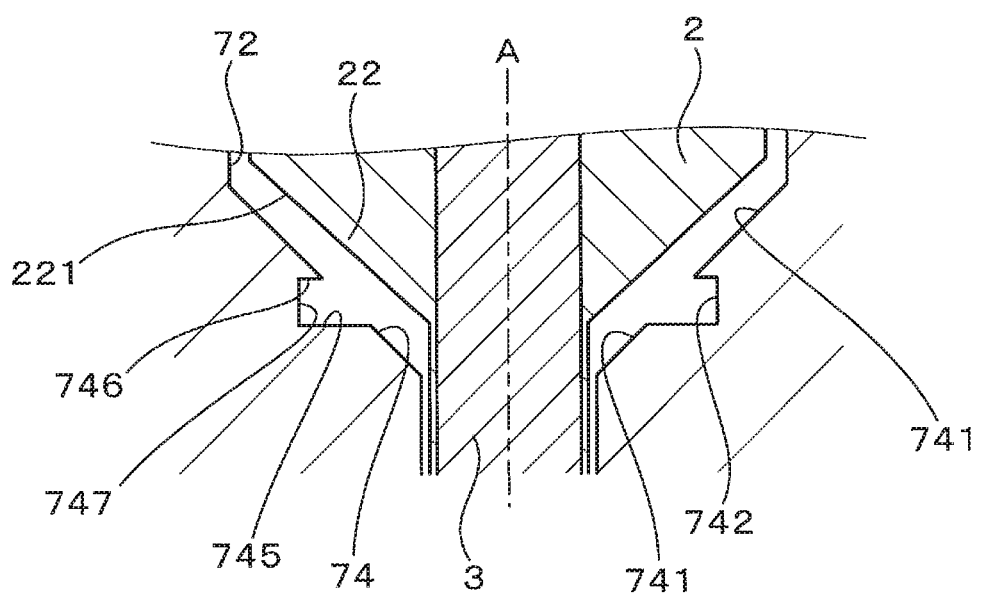
FIG. 23 is a cross-sectional explanatory view of showing a state before contact between the seat portion and the seat facing portion in the sixth embodiment.

In the glow plug 1 with the combustion pressure sensor in the present embodiment, as shown in FIGS. 22 and 23, the recessed portion 742 is shaped to extend radially outward from the tapered seat surface 741.

That is, the recessed portion 742 has wall surfaces 745 respectively formed on the tip side and base end side thereof in the axial direction. The wall surfaces 745 and 746 has a plane shape, and are orthogonal to the axial direction. The recessed portion 742 has a wall surface 747 formed on the outer peripheral side thereof; the wall surface 747 is parallel to the axial direction.

Other configurations are the same as those in the fifth embodiment.

The present embodiment also has the same operations and effects as the fifth embodiment.

Seventh Embodiment

Figure 24:
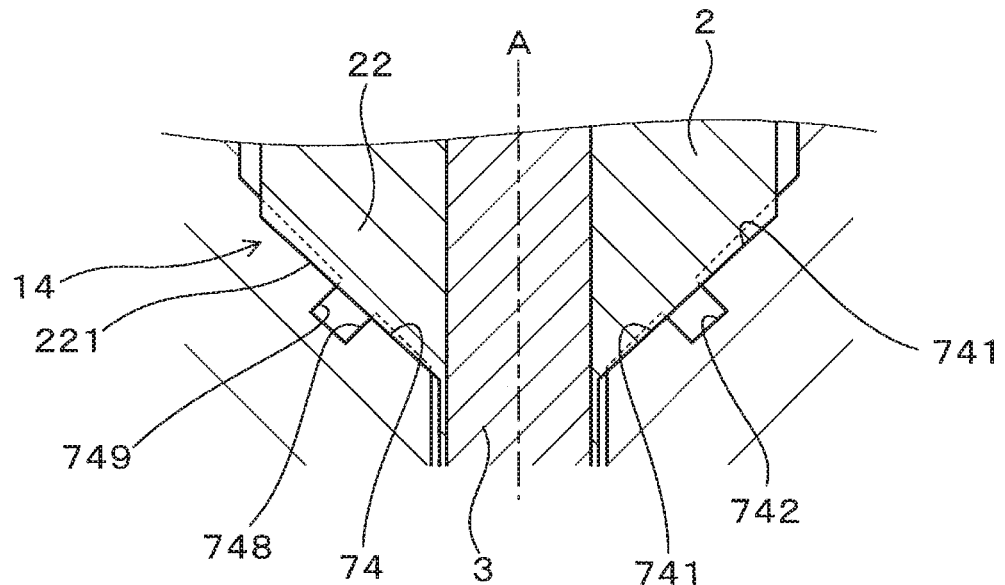
FIG. 24 is a cross-sectional explanatory view of showing a vicinity of a contact portion between a seat portion and a seat facing portion in a seventh embodiment.
Figure 25:
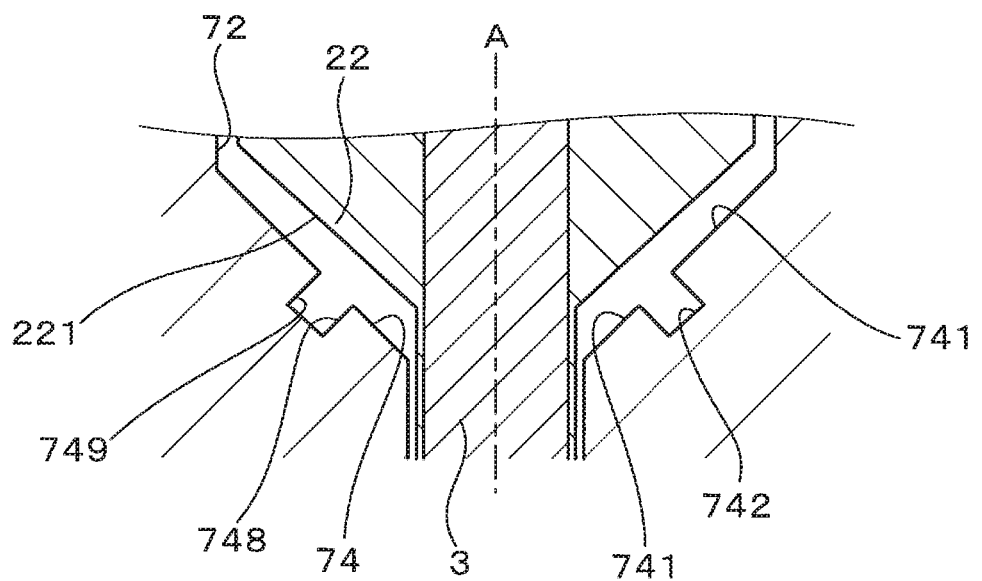
FIG. 25 is a cross-sectional explanatory view of showing a state before contact between the seat portion and the seat facing portion in the seventh embodiment.

In the glow plug 1 with the combustion pressure sensor in the present embodiment, as shown in FIGS. 24 and 25, the recessed portion 742 is formed to be concave in the direction perpendicular to the tapered seat surface 741.

That is, the recessed portion 742 has both an inner peripheral side wall surface 748 and an outer peripheral side wall surface 749 disposed parallel to the normal direction of the tapered seat surface 741.

Other configurations are the same as those in the fifth embodiment.

The present embodiment also has the same operations and effects as the fifth embodiment.

Although the present disclosure has been described in accordance with the above-described embodiments, the present disclosure is understood to be not limited to the embodiments and structures. The present disclosure encompasses various modifications and variations within the equivalent scope. In addition, the scope and idea of the present disclosure include various combinations and forms, as well as other combinations and forms including only one element, more than, or less.

What is claimed is:

1. An attachment structure of a glow plug with a combustion pressure sensor, in which the glow plug with the combustion pressure sensor is configured to be attached to an internal combustion engine, wherein:
the internal combustion engine comprises a combustion chamber and a plug hole communicating with the combustion chamber,
the plug hole has an inner wall surface, and the inner wall surface of the plug hole is formed with an internal thread portion and a seat portion located closer to the combustion chamber than the internal thread portion thereto, the seat portion protruding inward of the plug hole,
the seat portion has a tapered seat surface inclined to inwardly taper toward the combustion chamber,
the glow plug with the combustion pressure sensor comprises:
a cylindrical housing that is fixable to the plug hole;
a glow heater that is held in the housing and protrudes toward the combustion chamber;
a load transfer member that is disposed inside the housing and transfers compression strain as a pressure, the compression strain being generated in the housing due to generation of a combustion pressure in the combustion chamber; and
a pressure detector that detects the pressure received from the load transfer member,
the housing comprises:
an external thread portion screwed to the internal thread portion of the plug hole; and
a seat facing portion formed on a tip side of the housing relative to the external thread and facing the seat portion of the plug hole in an axial direction,
the seat facing portion has a tapered contact surface in surface contact with the tapered seat surface, and
a recessed portion is formed in a radial portion of the seat facing portion, and is axially recessed to be in non-contact with the seat portion, and is formed annularly about a central axis of the housing, wherein
the tapered contact surface is formed at each of a plurality of radial portions of the seat facing portion, the radial portions of the seat facing portion including a portion located on an inner peripheral side of the recessed portion, and a portion located on an outer peripheral side of the recessed portion.

2. The attachment structure according to claim 1, wherein:
the recessed portion is formed in the seat portion; and the recessed portion has an inner peripheral wall surface and an outer peripheral wall surface that are parallel to the axial direction.

3. The attachment structure according to claim 1, wherein:
another recessed portion is formed in another radial portion of the seat facing portion; and
the plurality of radial portions of the seat facing portion includes at least three radial portions of the seat facing portion.

4. A glow plug with a combustion pressure sensor, comprising:
a cylindrical housing that is fixable to a plug hole communicating with a combustion chamber of an internal combustion engine;
a glow heater that is held in an inside of a tip portion of the housing;
a load transfer member that is disposed inside the housing and transfers compression strain as a pressure, the compression strain being generated in the housing due to generation of combustion pressure in the combustion chamber; and
a pressure detector that detects the pressure received from the load transfer member,
wherein:
an internal thread portion and a seat portion are formed in an inner wall surface of the plug hole, the seat portion being located closer to the combustion chamber than the internal thread portion thereto, the seat portion protruding inward of the plug hole,
the seat portion has a tapered seat surface inclined to inwardly taper toward the combustion chamber,
the housing comprises:
an external thread portion screwed to the internal thread portion of the plug hole; and
a seat facing portion formed on a tip side of the housing relative to the external thread and facing the seat portion of the plug hole in an axial direction, and
the seat facing portion has:
a tapered contact surface in surface contact with the tapered seat surface; and
a recessed portion axially recessed to be in non-contact with the seat portion or the seat facing portion,
each of the tapered contact surface and the recessed portion being formed annularly about a central axis of the housing, wherein
the tapered contact surface is formed at each of a plurality of radial portions of the seat facing portion, the radial portions of the seat facing portion including a portion located on an inner peripheral side of the recessed portion, and a portion located on an outer peripheral side of the recessed portion.

5. A glow plug according to claim 4, wherein:
the recessed portion has an inner peripheral wall surface and an outer peripheral wall surface that are parallel to the axial direction.

6. A glow plug according to claim 4, wherein:
another recessed portion is formed in another radial portion of the seat facing portion; and
the plurality of radial portions of the seat facing portion includes at least three radial portions of the seat facing portion.

* * * * *